(12) United States Patent
Nikitin et al.

(10) Patent No.: US 9,176,215 B2
(45) Date of Patent: Nov. 3, 2015

(54) SYNTHETIC APERTURE RFID HANDHELD WITH TAG LOCATION CAPABILITY

(71) Applicant: Intermec IP Corp., Everett, WA (US)

(72) Inventors: Pavel Nikitin, Seattle, WA (US); KVS Rao, Bothell, WA (US); Rainer Brueckmann, Mukilteo, WA (US); Hunter Leland, Cedar Rapids, IA (US); Stephen Kelly, Marion, IA (US)

(73) Assignee: INTERMEC IP CORP., Everett, WA (US)

( * ) Notice: Subject to any disclaimer, the term of this patent is extended or adjusted under 35 U.S.C. 154(b) by 147 days.

(21) Appl. No.: 13/826,758

(22) Filed: Mar. 14, 2013

(65) Prior Publication Data

US 2013/0249736 A1   Sep. 26, 2013

Related U.S. Application Data

(60) Provisional application No. 61/614,343, filed on Mar. 22, 2012.

(51) Int. Cl.
*H04Q 5/22* (2006.01)
*G01S 5/02* (2010.01)
*G01S 5/12* (2006.01)
*G01S 13/74* (2006.01)

(52) U.S. Cl.
CPC .................. *G01S 5/02* (2013.01); *G01S 5/0257* (2013.01); *G01S 5/12* (2013.01); *G01S 13/74* (2013.01)

(58) Field of Classification Search
CPC ......... G01S 5/02; G01S 13/74; G01S 5/0257; G01S 5/12
USPC .................................................... 235/375–385
See application file for complete search history.

(56) References Cited

U.S. PATENT DOCUMENTS

| | | | |
|---|---|---|---|
| 2005/0237953 A1* | 10/2005 | Carrender et al. | 370/278 |
| 2006/0044147 A1* | 3/2006 | Knox et al. | 340/686.1 |
| 2008/0030320 A1* | 2/2008 | Wilcox et al. | 340/521 |
| 2009/0256693 A1* | 10/2009 | Brinton et al. | 340/439 |
| 2013/0043313 A1* | 2/2013 | Zolotov | 235/462.09 |

\* cited by examiner

*Primary Examiner* — Ojiako Nwugo
(74) *Attorney, Agent, or Firm* — Oliff PLC; R. Brian Drozd

(57) ABSTRACT

A system for determining a bearing or location of a radio frequency identification (RFID) tag using a handheld RFID reader is described. In one embodiment, the reader is equipped with an accelerometer. A user moves the reader while the reader receives the tag's signal and determines the tag signal's phase at multiple locations. The locations of the reader antenna can be reconstructed using the accelerometer data. By using the phase determined at multiple locations in conjunction with the location of the reader antenna, the reader can determine the bearing of the tag. For an RFID reader not equipped with an accelerometer, the sign and ratio of the rate of change in the phase of a tag's signal to the distance traveled by the reader antenna can be used to determine the location of the tag relative to the reader.

18 Claims, 10 Drawing Sheets

SYNTHETIC APERTURE RFID HANDHELD WITH TAG LOCATION CAPABILITY

CROSS-REFERENCE TO RELATED APPLICATIONS

This application claims the benefit of U.S. Provisional Application No. 61/614,343, entitled "SYNTHETIC APERTURE RFID HANDHELD WITH TAG LOCATION CAPABILITY", filed Mar. 22, 2012, and is hereby incorporated by reference in its entirety. This application is related to co-pending U.S. application Ser. No. 12/495,732, entitled, "METHOD AND SYSTEM TO DETERMINE THE POSITION, ORIENTATION, SIZE, AND MOVEMENT OF RFID TAGGED OBJECTS", filed Jun. 30, 2009 and is hereby incorporated by reference in its entirety.

BACKGROUND

Handheld RFID readers are typically used to scan for any RFID tags that are within range of the reader. Several hundred tags may respond, but a conventional RFID reader cannot identify the location of each individual tag. It would be useful for a reader to have the ability to locate the tags that respond to an RFID query.

However, conventional methods used to identify the location of a tag involve either the use of highly directional steerable transmitting antenna arrays or highly directional steerable receiving antenna arrays. These antenna arrays are expensive and large, typically several feet across. Another proposed method involves using a single motorized antenna moving on a rail to create an equivalent synthetic aperture. However, none of these approaches are suitable for use with a compact handheld RFID reader.

BRIEF DESCRIPTION OF THE DRAWINGS

Examples of a handheld RFID reader system are illustrated in the figures. The examples and figures are illustrative rather than limiting.

DETAILED DESCRIPTION

A system is described for determining a bearing or location of an RFID tag using an RFID reader equipped with an accelerometer. A user moves the reader while the reader receives the tag's signal and determines the tag signal's phase at multiple locations. The locations of the reader antenna can be reconstructed using data from the accelerometer. By using the phase determined at multiple locations in conjunction with the location of the reader antenna, the reader can determine the bearing of the tag.

For an RFID reader not equipped with an accelerometer, the ratio and sign of the rate of change in the phase of a tag's signal to the distance traveled by the reader antenna or the elapsed travel time can be used to determine the location of the tag relative to the reader.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Existing techniques use wireless communications for locating a tag, but they are not suitable for use with a handheld RFID reader that operates near 900 MHz in the ultrahigh frequency (UHF) band. The size of a UHF antenna is generally on the order of the wavelength of the frequency. For a frequency of 900 MHz, the wavelength is approximately 30 cm. Consequently, for a highly directional high gain antenna, the size of the antenna attached to the RFID reader would be large and unwieldy.

Another technique for locating a transmitter uses multiple antennas arranged in a phased array. When a tag responds to a query, the phase of the tag signal received at each antenna is compared to determine the direction of the tag. However, the phased array is also large and unwieldy.

The techniques presented below permit a handheld RFID reader with an internal antenna that is not highly directional to determine, in one case, an exact direction of the tag, and in another case, a location of the tag relative to the reader.

RFID Reader Equipped with Accelerometer

Figure 1:
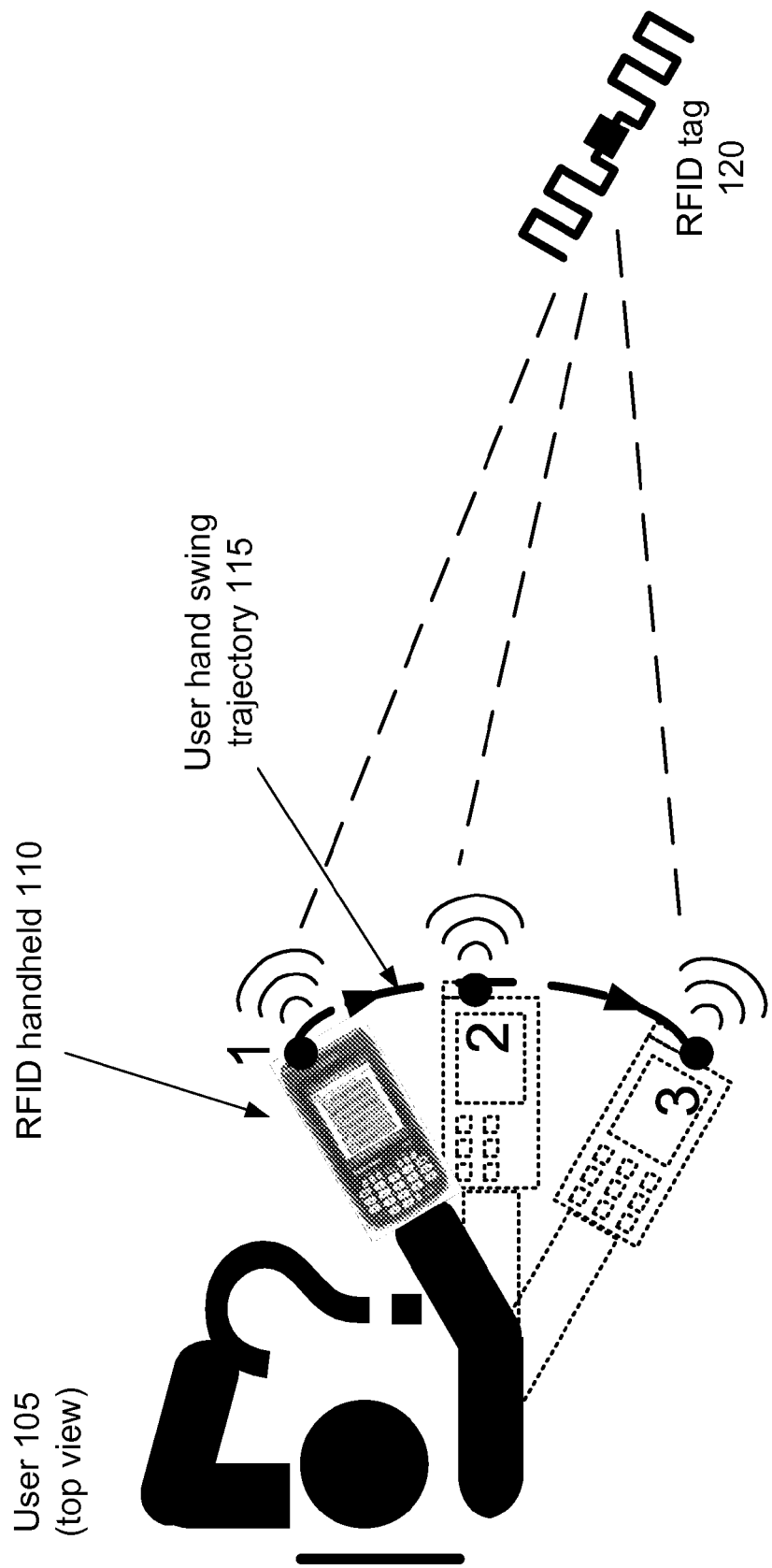
FIG. 1 shows an example of a user's example hand motion while holding an RFID reader that receives tag responses during the hand motion to determine the bearing of an RFID tag.

FIG. 1 shows an example of a user's hand motion while holding an RFID reader that receives tag responses during the hand motion to determine the bearing of an RFID tag. The locations of the reader antenna at the moment each of the tag responses are taken by the reader can be calculated using the accelerometer measurements to determine the bearing of an RFID tag.

The user 105 holds a handheld RFID reader 110 in his hand, and the reader 110 sends out an RFID query. When an RFID tag 120 responds to the RFID query, the RFID reader 110 receives the response and calculates the phase of the tag's response. To simulate receiving the tag response with multiple antennas, the RFID reader takes readings of the tag responses while the RFID reader (and internal antenna) is moved to different locations by the user. While RFID readers typically average the response from a tag to obtain a single phase value for the tag response, multiple phase data points can be obtained by a reader for each tag response. Additionally, the RFID reader can transmit more than one RFID query to elicit multiple responses from the tag while the reader is in motion.

The user can move the reader, for example, by swinging the reader in his hand. FIG. 1 shows an example trajectory 115 of the user's hand swinging in an arc from left to right in front of the user's body. However, movement of the reader in any direction will work, even in a zig-zag pattern, as long as the span of movement of the reader antenna is sufficiently wide. Because the span of movement of the antenna represents the equivalent synthetic aperture of a synthetic aperture antenna, the span of movement should be at least the wavelength of the tag signals. For UHF frequencies, the wavelength is approximately one foot. Additionally or alternatively, the user can travel, for example in a forward direction, while holding the reader.

The reader 110 is equipped with an accelerometer, an inertial measurement unit or other system to measure reader movement that can measure acceleration in three dimensions. The accelerometer measures the three components of acceleration, x, y, and z. By integrating the acceleration components over time, the velocity components are obtained, and by integrating the velocity components over time, the coordinate components are obtained. The coordinate components are used to determine the exact trajectory of the reader.

Measuring the phase of a tag's signal that is received at different points along the reader's trajectory is the functional equivalent of measuring a tag's signal using a phased antenna array. A phased antenna array is made up of several antennas, and the phase of a signal received at each antenna is compared to determine the direction the tag signal is coming from. With the phased array technique, it is critical to know the exact position of each antenna. The accelerometer data allows the exact position of the reader to be determined for each tag signal measurement that is taken.

An example reader equipped with an accelerometer can provide instructions on the screen for how the user should move his hand, e.g. in a swinging motion from left to right or right to left, and/or his body, e.g. take three steps forward. The reader can also provide instructions on when the user's movements should begin so that the tag measurements can be synchronized with the user's movements. Further, the reader can display on the screen the progress that the reader is making in taking successful measurements and calculating the tag direction, for example, in terms of probability. Once a certain level of confidence is reached, e.g. 90%, the user can be alerted that movement of the reader can be stopped.

Instead of or in addition to an accelerometer, the system may employ a gyroscope. Angular acceleration readings from the accelerometer(s) and/or gyroscope can provide information about the relative motion of the reader, that is, whether the reader is moving from left to right, or from right to left. With this information, the reader can operate in a mode where its display can further show arrows pointing to either the left or the right side of the reader that indicate to the user in which direction the tag is located relative to the reader. If the reader is moving from left to right and the phase is increasing, the tag will be to the right of the reader, and vice versa. Moreover, if there is not much angular acceleration, the reader can deduce that the user is moving the reader toward or away from the tag, rather than sweeping the reader from side to side across a trajectory to the tag, and provide an indication on the display with arrows pointing to the top or bottom of the reader.

Changes in hand motion, e.g. change in speed, tilt, or an unsteady trembling hand, have only a small effect on the accuracy of the tag signal data used for making phase calculations. Consider an example case where the reader can read 1000 tags per second; a user's hand motion has a speed of one meter per second during scanning; hand position variation along the scan trajectory is ±1 inch; hand tilt variation along the scan trajectory is ±10 degrees; typical distance to the tag is 10 feet which corresponds to the maximum read range of a typical handheld RFID reader; the reader antenna is directional with a measurement of 6 dBi; the tag antenna is omnidirectional having a measurement of 2 dBi; and the frequency is 915 MHz.

In free space, the received tag phase varies linearly with the distance d to the tag:

$$\varphi = -\frac{4\pi}{\lambda}d \quad (1)$$

When a tag is moved away from or towards the reader in free space, the tag signal phase changes by 360° (i.e., wraps around) for every half wavelength of radial tag movement. With the above method, the phase difference of the received tag signal is measured at two different receiving points along the user's hand trajectory. By using the accelerometer data, the path difference, a, can be calculated, and the two-dimensional tag bearing can be approximately calculated as:

$$\theta \approx \arcsin\left[-\frac{\lambda}{2\pi}\frac{(\varphi_2 - \varphi_1)}{a}\right], \quad (2)$$

where a is the spacing between the two measurement points (which may be computed based on output from the accelerometer).

Based on this free space theory and the assumed system parameters given above, the effects of unsteady hand motion on the accuracy of determining the bearing of a tag can be determined and is seen to have a small effect.

A finite tag identification rate of 1000 tags/sec over a hand sweep of 1 meter corresponds to one measurement per millimeter of movement, resulting in a very small calculated tag bearing error, less than 1°.

Due to a variation in hand tilt of ±10 degrees, the calculated tag bearing error is also very small, less than 1°. The error is small because the phase of the received signal depends on the antenna position. The antenna radiation pattern can have a lot of gain variation with angle, but the phase remains nearly constant with angle and may vary only by 30° over a 90° tilt.

Due to hand position variation of ±1 inch, the calculated tag bearing error is small, less than 5°, assuming that the tag signal measurements are made along the full 1 meter hand trajectory, and the end points are used for the calculation.

In a multipath environment, there may be additional errors due to reflections from different objects, and the errors can be analyzed using a RFID multipath propagation simulator. However, the majority of use cases for which the RFID reader is used are short range, direct line-of-sight RFID applications.

Figure 2:
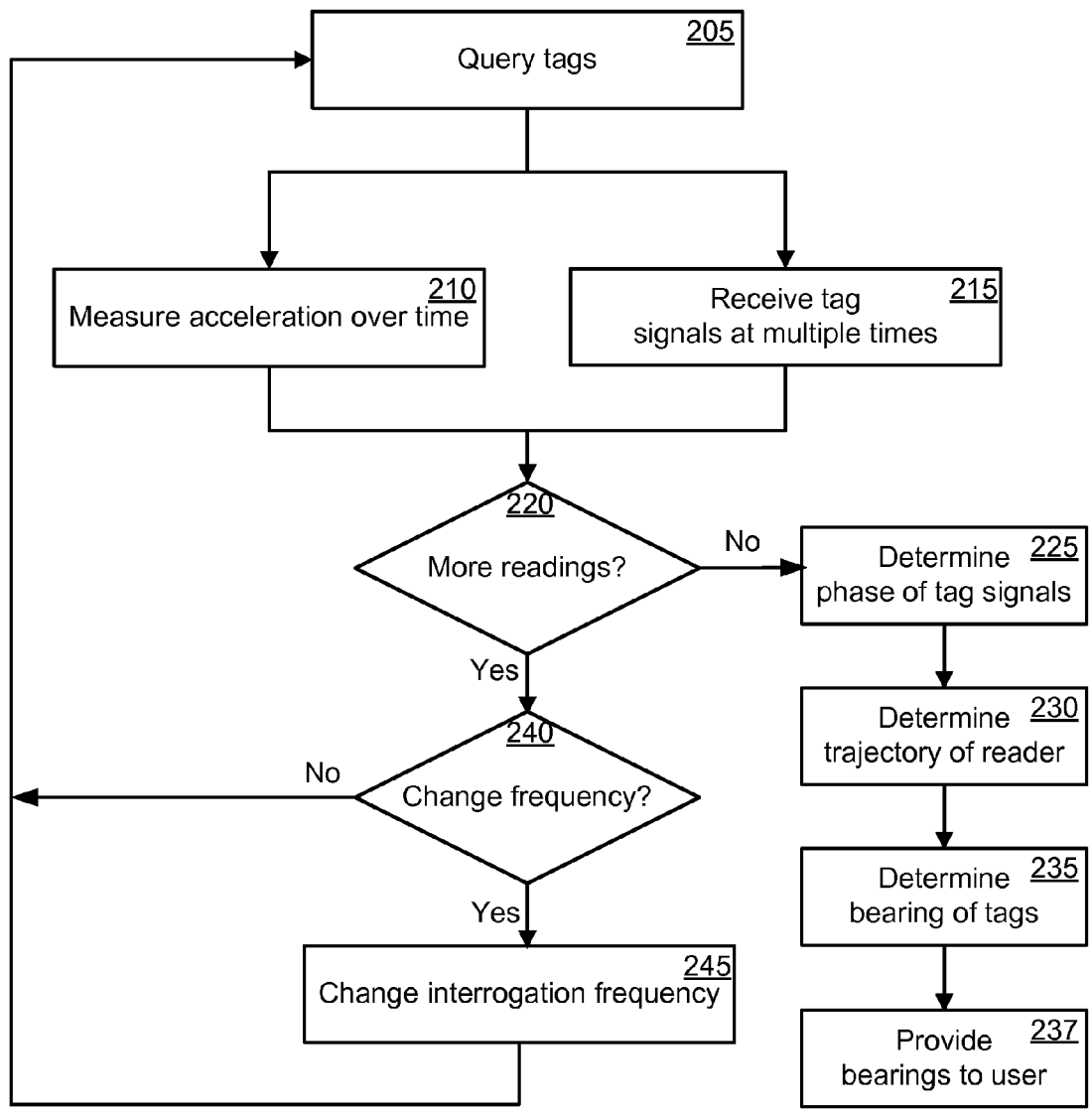
FIG. 2 is a flow diagram illustrating an example process of determining a bearing of an RFID tag.

FIG. 2 is a flow diagram illustrating an example process of determining the bearing of an RFID tag using an RFID reader equipped with a three-dimensional accelerometer. At block 205, the RFID reader transmits an RFID query that is received by RFID tags in the vicinity of the reader.

Upon receiving the RFID query, one or more RFID tags transmit a response to the query. At block 210, the accelerometer in the RFID reader measures the acceleration in the x,y,z directions while at the same time, at block 215 the RFID reader receives the responses of the tags for calculating the phases of the received tag signals.

In addition to needing the phase information for a tag at at least two positions of the reader antenna, typically, more than one tag signal data point is taken to ensure that the quality of the signal data is good. Factors that can degrade the quality of the data include taking a tag signal reading when the location of the reader antenna is at a multipath null and interference at the interrogation frequency, and consequently, response frequency. Poor quality data, for example, data that does not have a minimum signal strength, can be filtered out from the calculation of the tag's phase.

At decision block 220, the system determines whether to take more tag signal readings. The system can base this decision on whether a minimum level of confidence has been reached. If the system has sufficient data to determine the bearing of the tag (block 220—No), at block 225 the system calculates the phase of the received tag signals. Then at block 230, the system determines the trajectory of the reader from the accelerometer readings and the position of the reader at the time that the tag signal phase measurements were taken. Then at block 235, the system determines the bearing of the tags using the tag phase calculations and the location of the reader and provides the bearing information for each of the tags to the user at block 237.

If the system needs to take more measurements to determine the bearing of the tag (block 220—Yes), at decision block 240 the system determines whether to change the interrogation frequency of the RFID query. The system may decide to change the interrogation frequency for a few reasons. Due to interference from certain frequencies in the environment, it may be advantageous to take tag readings at different frequencies to ensure that the data is of sufficiently high quality. Furthermore, in the United States, RFID systems typically operate in the unlicensed 915 MHz ISM (industrial, scientific, medical) band (902-928 MHz). The Federal Communications Commission (FCC) mandates that transmitters having a minimum output power use frequency hopping with a limit set on the maximum dwell time at any one frequency in the band. Thus, to comply with FCC regulations, the system may need to change the interrogation frequency periodically.

If the system decides to maintain the same interrogation frequency (block 240—No), the process returns to block 205 to further query the tags. If the system decides to change the interrogation frequency (block 240—Yes), at block 245, the reader selects a different interrogation frequency. The process returns to block 205 to query more tags.

In one example, the RFID reader can read approximately 1000 tags per second. If the user moves his hand a distance of three feet over a time span of one second, and the reader changes frequencies every 0.3 seconds, the reader can obtain approximately 300 data points for each of three frequencies over the course of the one second time span.

In another example, the reader can select frequencies located at the ends of the frequency band of operation to ensure that any interference at one frequency is as far away in the frequency band as possible from the next selected frequency. Then the reader can hop back and forth between those frequencies to populate two data sets. Because there will be multi-path reflections that cause nulls specific to a particular frequency at particular locations, the calculated phases for each of the data sets for each frequency can be averaged, or the data from the best frequency channel can be used.

Figure 3:
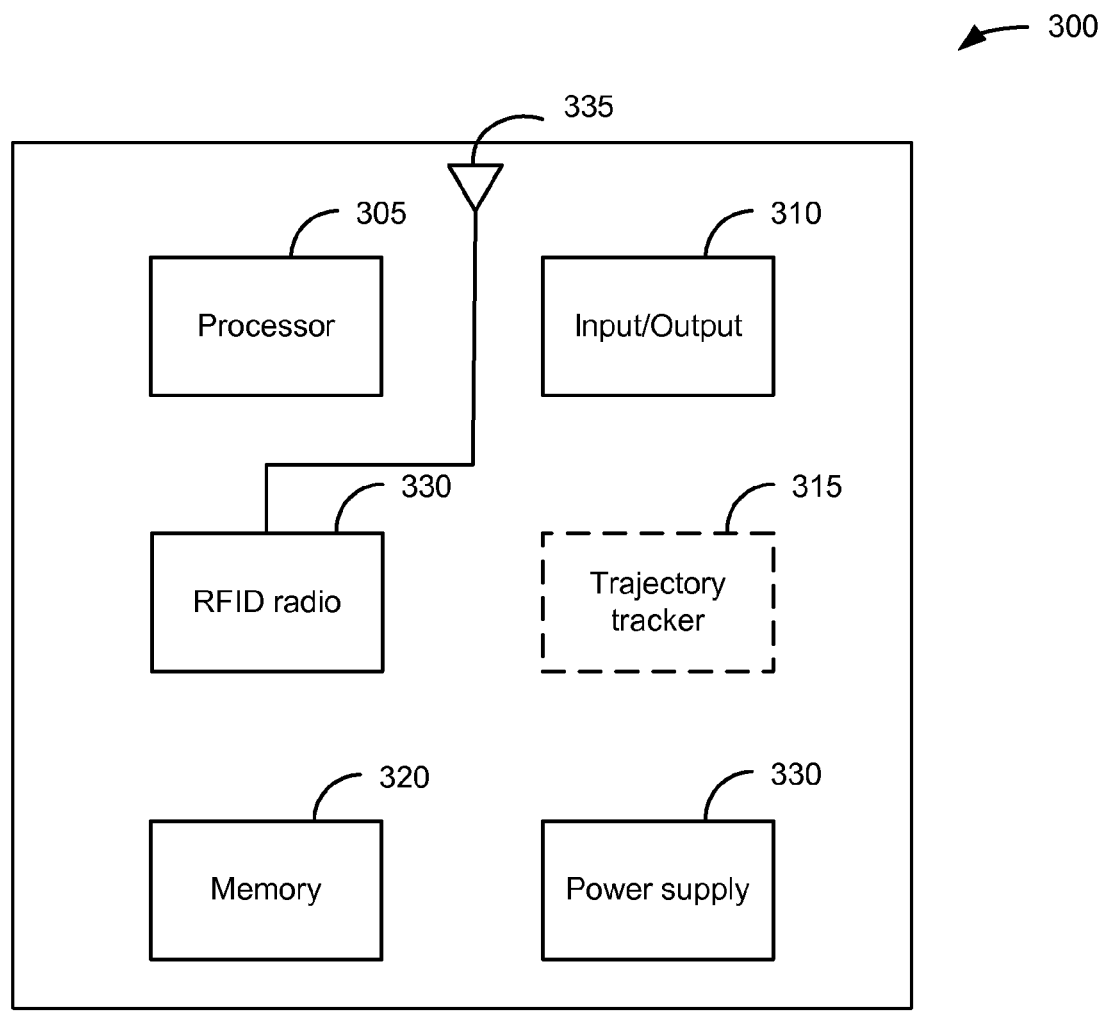
FIG. 3 depicts a block diagram of an example RFID system for determining the bearing of an RFID tag.

FIG. 3 shows a block diagram 300 of an RFID reader used to read RFID tags and determine the bearing of the tags. An RFID reader may include one or more processors 305, memory units 320, power supplies 325, input/output devices 310, trajectory tracker 315, and RFID radio 330 with antenna 335.

The accelerometer trajectory tracker 315 provides acceleration data for the reader in three orthogonal directions, for example, a single three-dimensional accelerometer or three one-dimensional accelerometers. The trajectory tracker 315 can include any combination and number of: accelerometers, gyroscopes, GPS or similar geo-positioning receivers where a sufficient positioning signal can be received, and wireless LAN or WAN receivers and ability to determine position/movement using known triangulation techniques.

A processor 305 may be used to run RFID reader applications. The processor 305 can calculate the phase of a received tag signal and reconstruct the trajectory or relative position of the reader from the accelerometer data and/or data from other devices that are able to detect movement and/or position of the reader to determine the bearing of the tag.

Memory 320 may include but is not limited to, RAM, ROM, and any combination of volatile and non-volatile memory. A power supply 325 may include, but is not limited to, a battery. An input/output device 310 may include, but is not limited to, triggers to start and stop the RFID reader or to initiate other RFID reader functions, visual displays, speakers, and communication devices that operate through wired or wireless communications. An RFID radio 330 includes standard components for communication with RFID tags including an internal antenna 335.

RFID Reader without Accelerometer

Although the use of accelerometer readings permits the determination of the bearing of a tag from the RFID reader fairly accurately, calculating the relative positions of the moving reader from the accelerometer data is complex.

It is possible to determine the relative tag location (front, back, or sides) with respect to an RFID reader without the use of an accelerometer. A change in position of the reader antenna due to motion of the reader will result in a corresponding change in the phase of the received tag signal. By analyzing the change of phase of the tag signal as a function of antenna movement distance or, equivalently, elapsed movement time, it is possible to determine the relative location of the tag. This method is the inverse of the time division—phase difference of arrival (TD-PDOA) technique where instead of a having fixed reader antennas and moving tags, the tags are fixed and the reader antenna moves. The TD-PDOA technique is described in U.S. application Ser. No. 12/495,732, entitled, "METHOD AND SYSTEM TO DETERMINE THE POSITION, ORIENTATION, SIZE, AND MOVEMENT OF RFID TAGGED OBJECTS", filed Jun. 30, 2009.

Figure 4A:
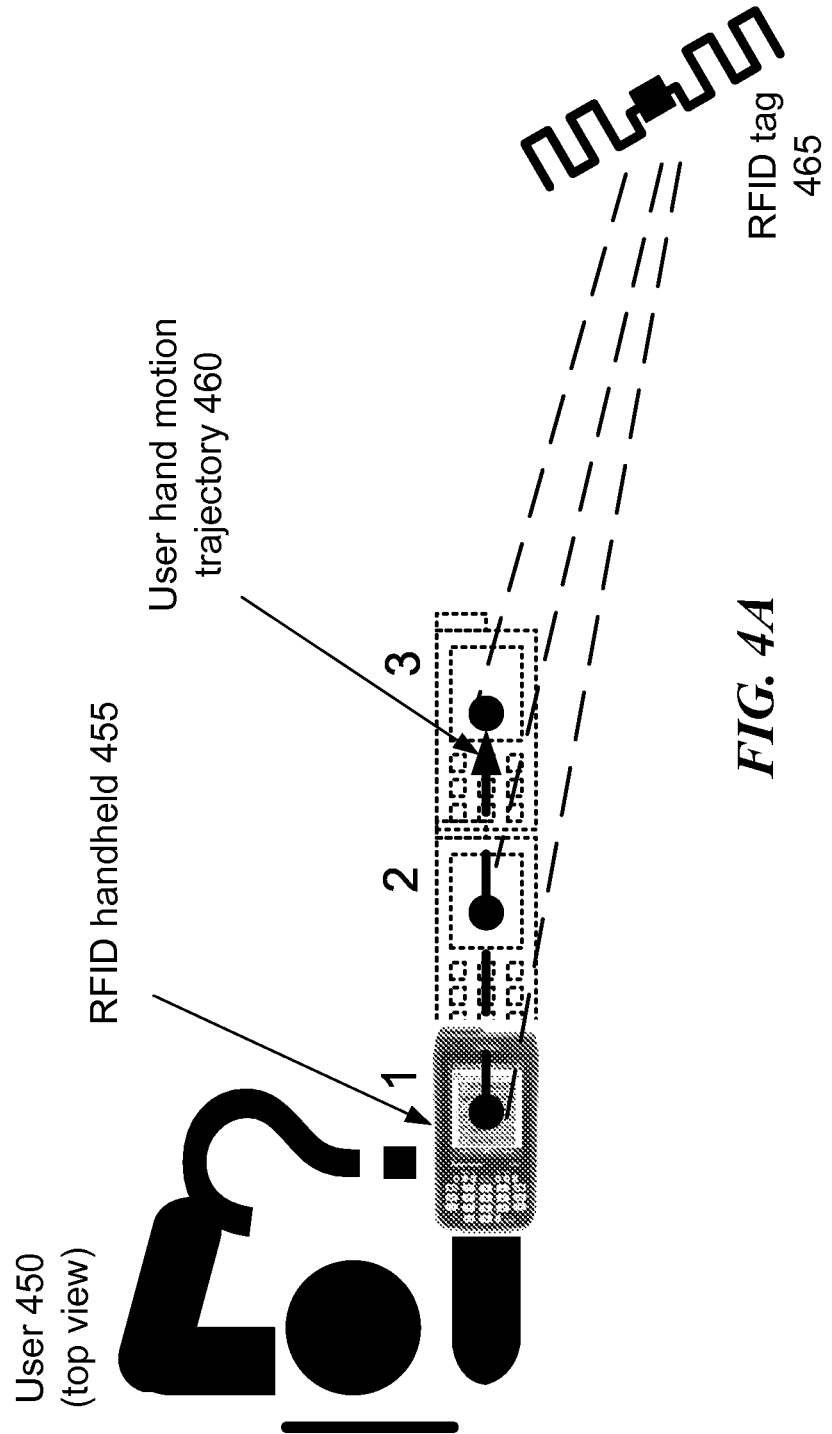
FIG. 4A shows an example of a user's example hand motion while holding an RFID reader not equipped with an accelerometer that can determine the location of tags relative to the reader.

FIG. 4A shows an example of a user's hand motion while holding an RFID reader, not equipped with an accelerometer, that can determine the location of tags relative to the reader. The user 450 holds a handheld RFID reader 455 in his hand, and the reader 455 sends out an RFID query. When an RFID tag 465 responds to the RFID query, the RFID reader 455 receives the response and calculates the phase of the tag's response. To simulate receiving the tag response with multiple antennas, the RFID reader 455 takes readings of the tag responses while the RFID reader (and internal antenna) is moved in a forward direction (or in any direction, provided the reader is aware of the relative direction of movement).

Because the reader does not have an accelerometer, the exact distance that the reader travels is not known. However, the exact distance traveled is not necessary because the calculated phase can be plotted as a function of the time that the reader is moved in a particular direction to determine the phase slope and a corresponding location of the tag relative to the reader. If the user moves the reader with a constant velocity motion, the plot of the phase as a function of time will be a smooth linear curve. If the movement of the reader is jerky such that the motion accelerates and/or decelerates, the curve will not be as smooth. However, the general trend where the phase of the tag increases or decreases with time still applies.

Figure 4B:
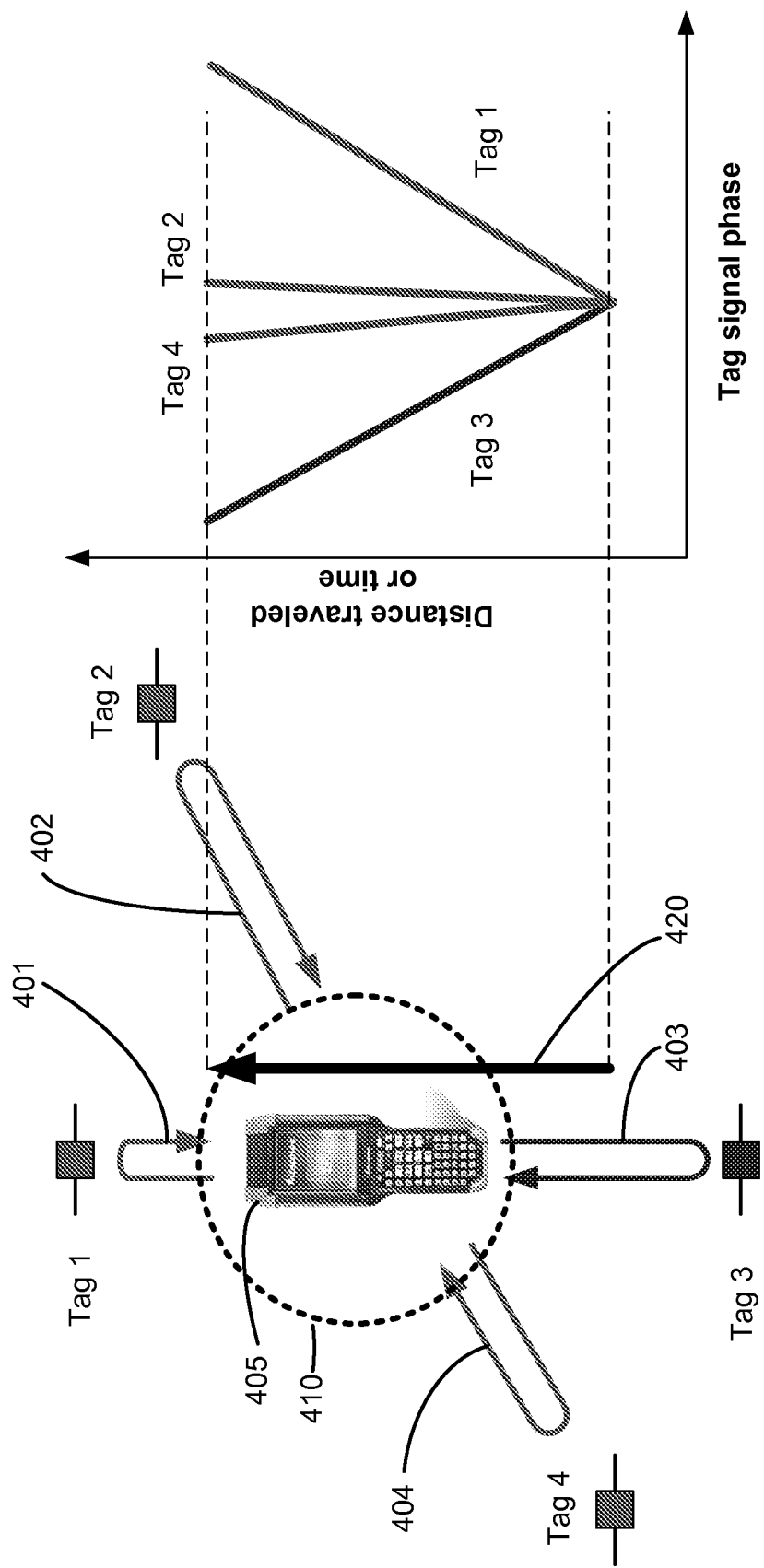
FIG. 4B shows the locations of tags relative to an RFID reader and calculated phases of the tags as a function of time or distance traveled.

FIG. 4B shows an RFID reader 405 that has a low gain internal antenna with an omnidirectional pattern 410. There are four RFID tags in the vicinity of the reader 405. Tag 1 is located directly in front of the reader 405; tag 2 is located ahead and to the right of the reader 405; tag 3 is located directly behind the reader 405; and tag 4 is located behind and to the left of the reader 405. The phase of each tag signal received at the reader 405 is dependent on the round-trip distance between the reader 405 and each of the respective tags. The round-trip distance between each of tag 1, tag 2, tag 3, and tag 4 and the reader is represented by the respective lines 401, 402, 403, and 404.

The arrow 420 indicates a direction for an example motion of the reader 405 made by the user. The reader motion can be performed by the user moving his hand while holding the reader in the indicated direction, or by the user traveling in the indicated direction, or a combination of both. As the reader 405 moves in the indicated direction, the round-trip distances 401, 402, 403, and 404 will change. Equation (1) above shows the relationship between the tag phase and the distance between the tag and the reader. The graph on the right of FIG. 4 shows the phase of the received tag signal for each of the tags as a function of the distance traveled or elapsed travel time by the reader 405 and its internal antenna.

The example motion 420 is linear and directly towards tag 1 and directly away from tag 3. Thus, the change of phase of the received signal for these tags is largest as the reader is moved forward and, correspondingly, has the largest slopes in the graph. Tag 1 which is in front of the reader has a positive slope, and tag 3 which is behind the reader has a negative slope. When a tag is to the side of the reader, the slope of the phase as a function of distance traveled or elapsed travel time will be intermediate to the slopes of the tags immediately ahead of and behind the reader. For example, tag 2 is in front of the reader so it has a positive slope, but the slope is smaller than that of tag 1. Similarly, tag 4 is behind the reader so it has a negative slope with a smaller magnitude than that of tag 3. Thus, the slope of the calculated phase as a function of distance traveled by the reader or elapsed travel time can be used to determine the relative location of the tag with respect to the reader.

Figure 7A:
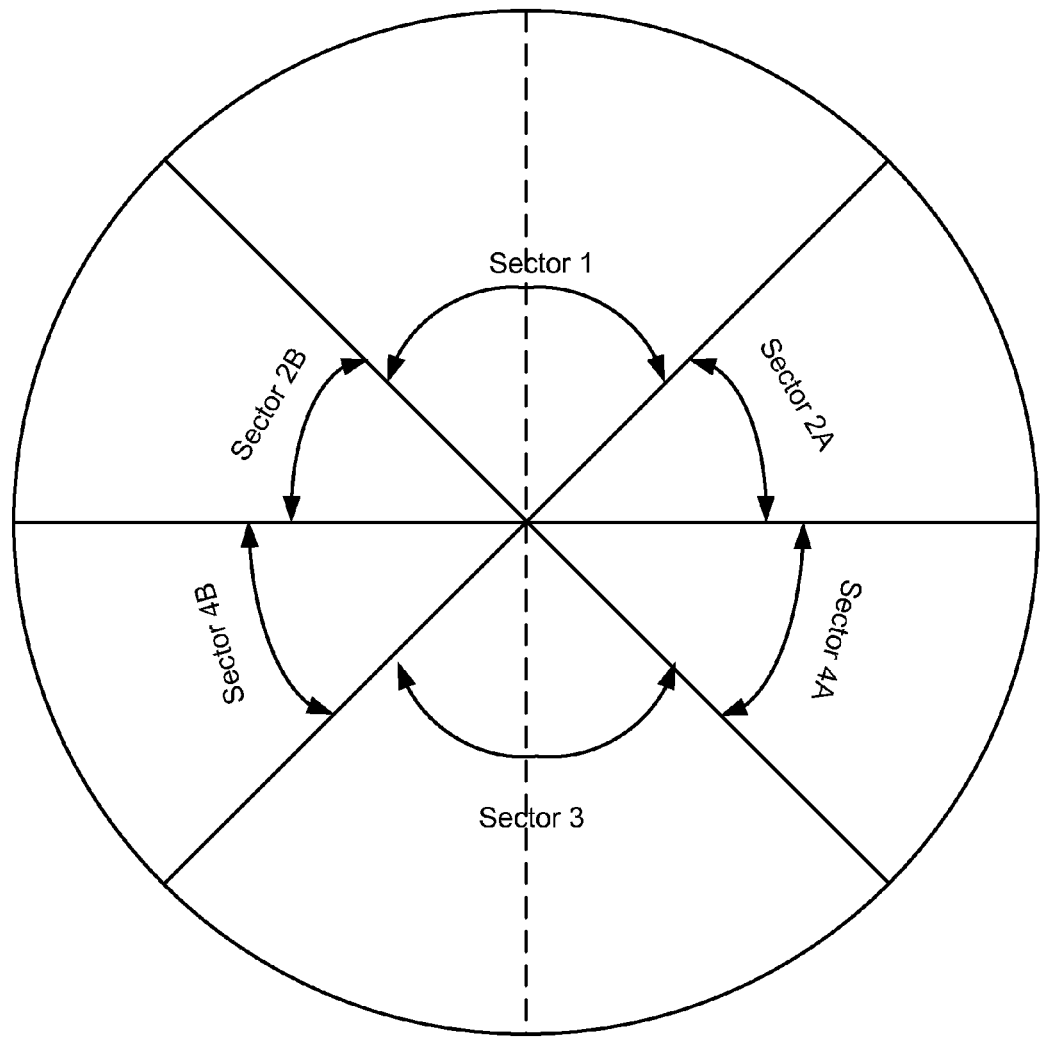
FIG. 7A shows a diagram of example sectors where an RFID tag may be determined to be located relative to the RFID reader.

In one example, if the reader detects responses from, for example, 20 RFID tags, based upon the change of phase with movement of the reader, the relative positions of the tags can be identified as one of the example sectors shown in FIG. 7. A tag located in sector 1 would have a large positive change in phase over an elapsed period of time (phase slope), and a tag located in sector 3 would have a large negative phase slope. A tag located in either sector 2A or sector 2B would have a small (or zero) positive phase slope, and a tag located in either sector 4A or sector 4B would have a small (or zero) negative phase slope.

In one configuration, the reader without an accelerometer can use an electronic compass to determine when the reader is in motion. The data obtained from the electronic compass can be used in conjunction with equation (1) to more accurately determine the phase slope, and thus, the relative location of a tag.

Figure 6A:
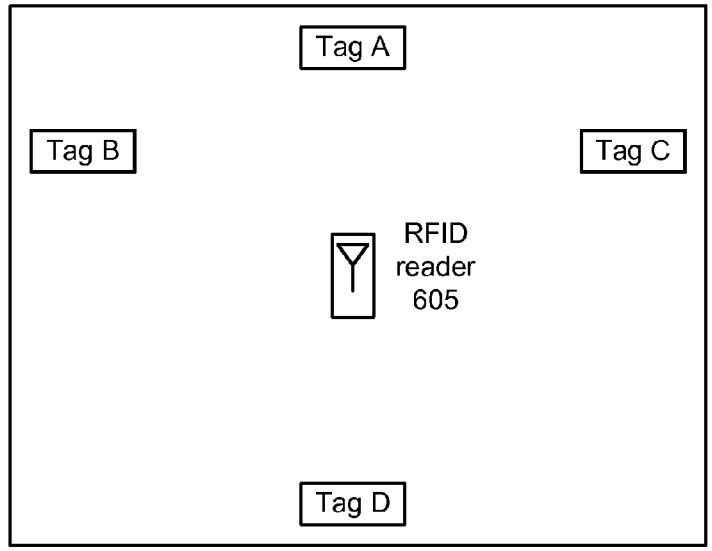
FIG. 6A shows an experimental layout for measuring locations of RFID tags relative to an RFID reader.

FIG. 6A shows an experimental layout where the RFID reader 605 has an internal antenna with a substantially omnidirectional gain pattern. Tag A is located directly in front of the reader. Tag D is located directly behind the reader. Tag B is located ahead of the reader to the left, and tag C is located ahead of the reader to the right. As the reader 605 is moved toward tag A, the reader receives signals from each of the tags and calculates the phase.

Figure 6B:
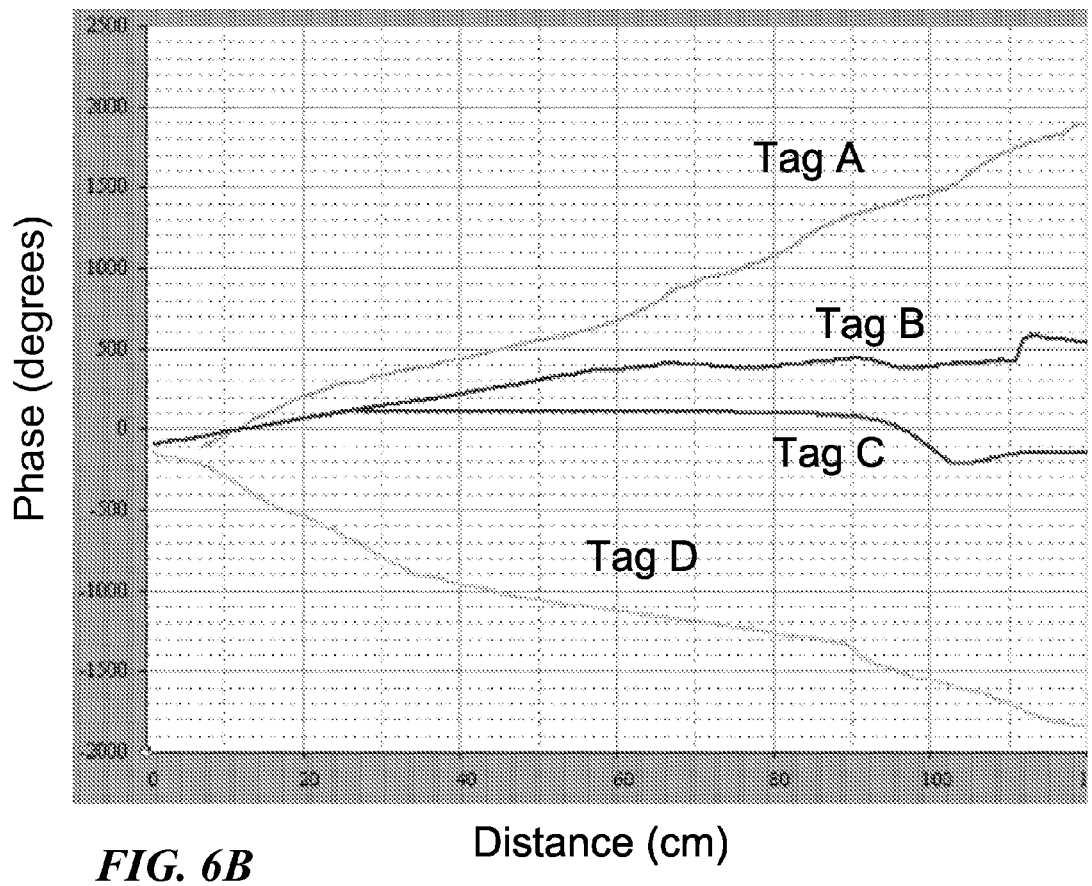
FIG. 6B shows a graph of calculated tag signal phases as a function of distance traveled by the RFID reader based on experimental data.

FIG. 6B shows the calculated phase in degrees for each of the tags in the experimental layout of FIG. 6A as a function of distance that the reader is moved. Tag A, the tag located in front of the direction in which the reader was moved, has the strongest positive slope, while Tag D, the tag located in the opposite direction in which the reader was moved, has the strongest negative slope. Because tags B and C are intermediate in position between Tags A and D, they have slopes between those of tags A and D.

Figure 5:
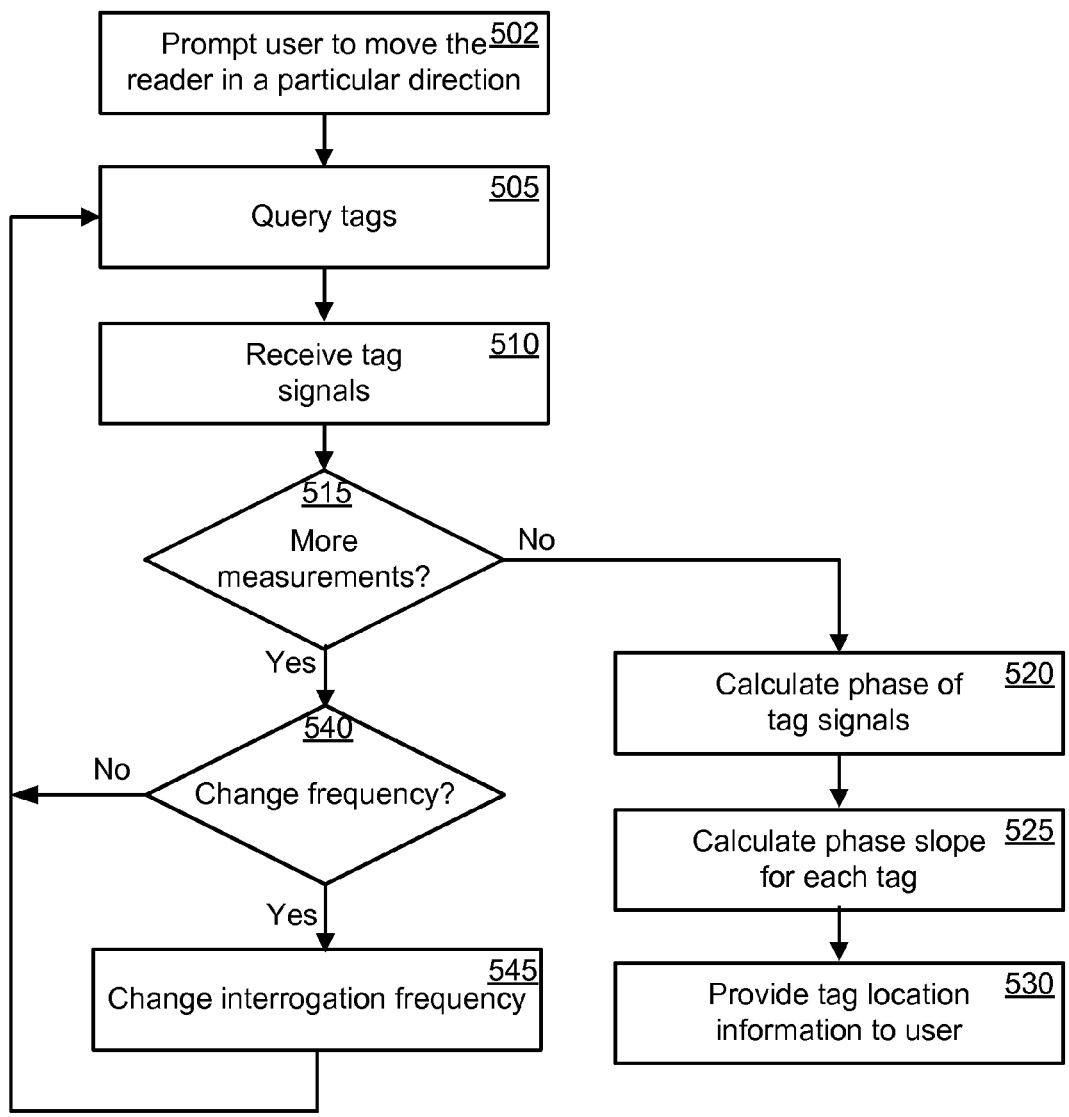
FIG. 5 is a flow diagram illustrating an example process of determining a location of an RFID tag relative to an RFID reader.

FIG. 5 is a flow diagram illustrating an example process of determining a location of an RFID tag relative to an RFID reader. At block 502, the reader prompts the user to move the reader (and thus antenna) in a particular direction. The direction can be selected by either the reader or the user, as long as the reader knows in which direction it will be moved so that the relative locations where the tags are located can be accurately assigned.

At block 505, the RFID reader transmits an RFID query that is received by RFID tags in the vicinity of the reader. Upon receiving the RFID query, one or more RFID tags transmit a response to the query. At block 510, the RFID reader receives the responses of the tags.

Then at decision block 515, the reader determines whether to take more tag signal readings. If the system does not have sufficient data to determine the relative location of the tag (block 515—Yes), at decision block 540, similar to decision block 240 in process 200 described above, the system decides whether to change the interrogation frequency of the RFID query. If the system decides to maintain the same interrogation frequency (block 540—No), the process returns to block 505 to further query the tags. If the system decides to change the interrogation frequency (block 540—Yes), at block 545, the reader selects a different interrogation frequency. The process returns to block 505 to query more tags.

If the system has sufficient data to determine the relative location of the tag (block 515—No), at block 520 the system calculates the phase of the received tag signals. Then at block 525, the system determines the phase slope for each tag.

Figure 7B:
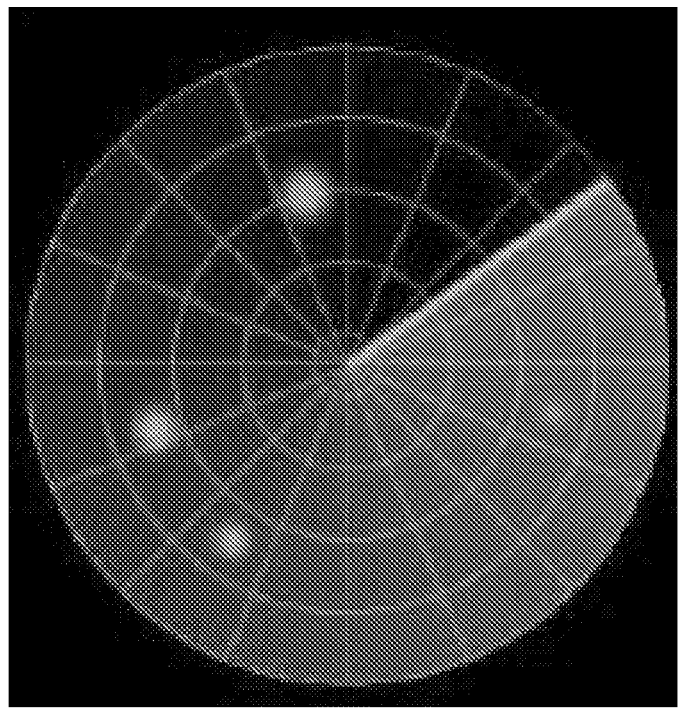
FIG. 7B depicts a diagram of an example RFID radar display showing where RFID tags may be located relative to the RFID reader.

At block 530 the system provides the tag location information to the user based on the calculated phase slopes. One way to provide the tag location information is to list the tags and provide a corresponding area for the relative location of the tag, such as the example sectors shown in FIG. 7A. FIG. 7B depicts a diagram of an example RFID radar display showing where RFID tags of interest may be located relative to the RFID reader.

Additionally or alternatively, the system can provide audio information to the user about the proximity of the reader to an RFID tag. For example, the reader can provide an audio output similar to a Geiger counter where an audio output component of the reader emits a sound, such as a click or beep, when a tag has been read and identified. Subsequently, the rapidity with which the reader repeats the sound can be used to convey whether the phase of the identified tag is increasing or decreasing. For example, the sound can be emitted more rapidly in response to a measured increase in phase, while the sound can be emitted less rapidly when the measured phase decreases. In some instances when the reader passes the identified tag, there will be a transition from an increasing phase to a decreasing phase, or vice versa, and the rapidity of the emission can be set to be at a maximum when a transition is detected.

Another way of providing audio information to the user about the proximity of the reader to the tag is to emit a low frequency tone when the tag of interest has been read and identified. Then, the phase increases when the user moves the reader and a phase wrap occurs, and the frequency of the tone is increased. And when the phase decreases and a phase wrap occurs, the frequency of the tone is decreased. With both of these audio techniques, the user can tell merely by listening to the audio output of the reader whether the reader has passed the tag.

The block diagram of FIG. 3 showing the RFID reader equipped with accelerometer can be adapted to apply to the RFID reader without accelerometer by removing the accelerometer block 315. The other blocks function in the same manner as described above, except for the input/output 310 and the processor 305. As described above, the input/output 310 can also include an audio output component, such as a speaker for providing audio information to the user.

The processor 305 can use a clock to time the motion of the reader to determine a phase slope for each tag. The processor 305 can also identify the locations of the tags relative to the reader from the phase slopes. Further, the processor 305 can control the rapidity or period of repetition of the emission of a sound from the audio output component and the frequency of the emitted tone of the sound.

RFID Reader with Dual Antennas

Figure 8:
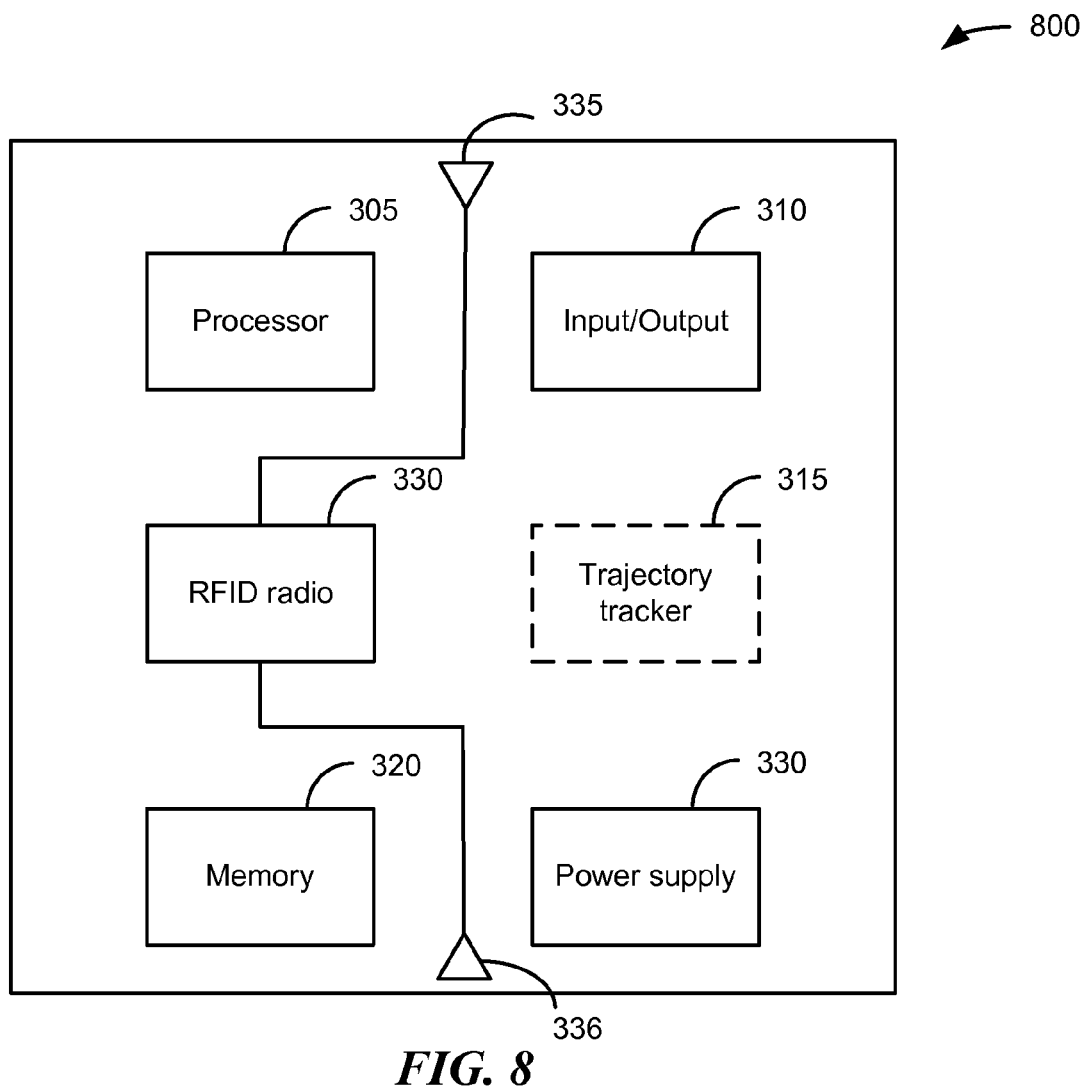
FIG. 8 depicts a block diagram of an example RFID system having two antennas.

FIG. 8 depicts a block diagram of an example RFID reader system for determining the bearing of an RFID tag, where the reader is equipped with an accelerometer and two internal antennas. The system components are the same ones as described in FIG. 3. Additionally, the (front) antenna 335 is located near the front of the RFID reader, while a rear antenna 336 is located near the rear of the RFID reader. For a typical RFID reader, the front antenna 335 and the rear antenna 336 are separated by nearly the length of the unit, approximately six inches. By using both antennas 335, 336 for receiving tag signals, the user does not need to move the reader as far to obtain the range of positions for the antennas.

Similar to the adaptation of FIG. 3 for an RFID reader without an accelerometer that can determine a location of a tag relative to the reader, FIG. 8 can also be modified by removing the accelerometer block 315 to apply to the RFID reader without an accelerometer and similarly modifying the function of the processor 305.

RFID Reader with Motorized Antenna

In one configuration, the RFID reader's antenna can be motorized to move the antenna, for example, to extend outside the reader, or even to travel within the body of the reader. By motorizing the movement of the antenna, the user may not have to move the reader at all, or may need to move the reader a smaller distance than without the use of the motorized antenna. The motorized antenna can be used with both the RFID reader equipped with an accelerometer and the RFID reader without an accelerometer.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

We claim:

1. An RFID (radio frequency identification) reader comprising:
 a location or movement determination component configured to measure location or acceleration of the reader in three dimensions;
 at least one RFID radio having a first antenna;
 at least one data memory component;
 at least one input/output component configured to prompt a user to move the reader; and
 at least one processor coupled among the location or movement determination component, the RFID radio, the data memory component, and the input/output component, wherein the processor is configured to:
  transmit a first RF (radio frequency) query using the RFID radio;
  calculate a first phase and a second phase for a tag signal sent by a tag in response to the first RF query, wherein a first phase corresponds to the tag signal received at a first position of the first antenna, and wherein the second phase corresponds to the tag signal received at a second position of the first antenna;
  calculate a trajectory or positions of the moving reader using data from the location or movement determination component; and
  determine a bearing for the tag using the calculated trajectory or positions and the calculated first phase and second phase for the tag,
 wherein the input/output component is further configured to:
  prompt the user when to move the reader to synchronize with received tag signals;
  display progress in determining the bearing for the tag; and
  display the determined bearing for the tag.

2. The RFID reader of claim 1, wherein the at least one RFID radio has a second antenna, and wherein the processor is further configured to calculate a third phase and a fourth phase corresponding to the tag signal received at the second antenna, and wherein determining the bearing for the tag further uses the calculated third phase and fourth phase for the tag.

3. The RFID reader of claim 1, wherein the first antenna is motorized.

4. The RFID reader of claim 1, wherein the location or movement determination component comprises a trajectory tracker.

5. The RFID reader of claim 4, wherein the location or movement determination component provides angular acceleration data for the moving reader, and wherein the processor is further configured to determine from the angular acceleration data a location of the tag relative to the moving reader, and further wherein the input/output component is configured to display an indication of a direction of the tag relative to the moving reader.

6. The RFID reader of claim 1, wherein the system determines whether to take more tag signal readings based on whether a minimum level of confidence has been reached, and wherein the RFID radio transmits on a different frequency when the minimum level of confidence is not achieved within a predetermined time period.

7. An RFID (radio frequency identification) reader comprising:
 at least one RFID radio having a first antenna;
 at least one data memory component;
 at least one input/output component configured to prompt a user to move the reader in a first direction; and
 at least one processor coupled among the RFID radio, the data memory component, and the input/output component, wherein the processor is configured to:
  transmit a first RF (radio frequency) query using the RFID radio;
  calculate a first phase and a second phase for a tag signal sent by a tag in response to the first RF query, wherein a first phase corresponds to the tag signal received at a first position of the first antenna, and wherein the second phase corresponds to the tag signal received at a second position of the first antenna, and wherein the first and second positions correspond to movement of the reader in the first direction;
  calculate a change of phase of the tag signal as a function of time using the first phase and the second phase; and
  determine a location of the tag relative to the movement direction of the reader based on the calculated change of phase as a function of time;
 wherein the RFID reader is configured to determine when the RFID reader is in motion, further wherein data from the RFID reader is used to determine the change of phase of the tag as a function of time.

8. The RFID reader of claim 7, wherein the first antenna is motorized.

9. The RFID reader of claim 7, wherein the at least one RFID radio has a second antenna, and wherein the processor is further configured to calculate a third phase and a fourth phase corresponding to the tag signal received at the second antenna, and wherein determining the bearing for the tag further uses the calculated third phase and fourth phase for the tag.

10. The RFID reader of claim 7, wherein the input/output component is further configured to display the determined location of the tag relative to the movement direction of the reader.

11. The RFID reader of claim 7, wherein a large positive change of phase as a function of time results when the direction of movement of the reader is toward the tag; and a large negative change of phase as a function of time results when the direction of movement of the reader is away from the tag.

12. The RFID reader of claim 7, wherein the input/output component is configured to emit a series of sounds, wherein characteristics of the series of sounds are controlled by the processor, and further wherein the processor is configured to change a period of repetition of the sounds in the series or a frequency of the series of sounds based upon the change of phase.

13. A method of determining a location of an RFID (radio frequency identification) tag relative to an RFID reader, the method comprising:
 prompting the user to move the reader in a first direction;
 using an RFID transceiver having an antenna to send a first RF query;
 calculating a first phase and a second phase for a tag signal sent by a tag in response to the first RF query, wherein a first phase corresponds to the tag signal received at a first location of the first antenna, and
wherein the second phase corresponds to the tag signal received at a second location of the first antenna, and
wherein the first and second locations correspond to movement of the reader in the first direction;
calculating a change of phase of the tag signal as a function of distance traveled by the reader using the first phase and the second phase;
determining a position of the tag relative to the movement direction of the reader based on the calculated change of phase as a function of time; and
displaying the position of the tag relative to the reader emitting sounds, wherein the sounds based upon the change of phase.

14. The method of claim 13, further comprising determining a confidence level of the relative location of the tag, and if a minimum level of confidence is not satisfied, sending a second RF query using the RFID radio.

15. The method of claim 14, wherein the second RF query uses a different frequency than the first RF query.

16. An apparatus for determining a location of an RFID (radio frequency identification) tag, the apparatus comprising:
means for prompting a user to move an RFID reader, where the reader includes a module for determining a location or movement of the reader;
means for using an RFID transceiver having an antenna to transmit a first RFID interrogation signal;
means for calculating a first phase and a second phase for a tag signal sent by a tag in response to the first interrogation signal, wherein a first phase corresponds to the tag signal received at a first location of the antenna, and wherein the second phase corresponds to the tag signal received at a second location of the antenna;
means for calculating a trajectory or locations of the moving reader using data from the module for determining a location or movement of the reader;
means for determining a location for the tag using the calculated trajectory or positions and the calculated first phase and second phase for the tag.

17. An RFID (radio frequency identification) reader comprising:
a location or movement determination component configured to measure location or acceleration of the reader in three dimensions;
at least one RFID radio having a first antenna;
at least one data memory component;
at least one input/output component configured to prompt a user to move the reader; and
at least one processor coupled among the location or movement determination component, the RFID radio, the data memory component, and the input/output component, wherein the processor is configured to:
transmit a first RF (radio frequency) query using the RFID radio;
calculate a first phase and a second phase for a tag signal sent by a tag in response to the first RF query, wherein a first phase corresponds to the tag signal received at a first position of the first antenna, and wherein the second phase corresponds to the tag signal received at a second position of the first antenna;
calculate a trajectory or positions of the moving reader using data from the location or movement determination component; and
determine a bearing for the tag using the calculated trajectory or positions and the calculated first phase and second phase for the tag,
wherein the system determines whether to take more tag signal readings based on whether a minimum level of confidence has been reached, and wherein the RFID radio transmits on a different frequency when the minimum level of confidence is not achieved within a predetermined time period.

18. An RFID (radio frequency identification) reader comprising:
at least one RFID radio having a first antenna;
at least one data memory component;
at least one input/output component configured to prompt a user to move the reader in a first direction; and
at least one processor coupled among the RFID radio, the data memory component, and the input/output component, wherein the processor is configured to:
transmit a first RF (radio frequency) query using the RFID radio;
calculate a first phase and a second phase for a tag signal sent by a tag in response to the first RF query, wherein a first phase corresponds to the tag signal received at a first position of the first antenna, and wherein the second phase corresponds to the tag signal received at a second position of the first antenna, and wherein the first and second positions correspond to movement of the reader in the first direction;
calculate a change of phase of the tag signal as a function of time using the first phase and the second phase; and
determine a location of the tag relative to the movement direction of the reader based on the calculated change of phase as a function of time,
wherein the input/output component is configured to emit a series of sounds, wherein characteristics of the series of sounds are controlled by the processor, and further wherein the processor is configured to change a period of repetition of the sounds in the series or a frequency of the series of sounds based upon the change of phase.

* * * * *